United States Patent [19]

Cherveny et al.

[11] Patent Number: 5,188,685
[45] Date of Patent: Feb. 23, 1993

[54] PNEUMATIC RADIAL TIRE INCLUDING STEEL BELT CORDS OF 2+2X.30HT CONSTRUCTION

[75] Inventors: Mark V. Cherveny, Mogadore; Keith C. Trares, Akron; Terry J. Waibel, Wadsworth; William M. Hopkins, Hudson; Italo M. Sinopoli, Canton; Ray A. Young, East Sparta, all of Ohio

[73] Assignee: The Goodyear Tire & Rubber Company, Akron, Ohio

[21] Appl. No.: 432,650

[22] Filed: Nov. 7, 1989

[51] Int. Cl.$^5$ ............... B60C 9/20; B60C 9/18; B60C 9/00
[52] U.S. Cl. .................. 152/451; 152/526; 152/527
[58] Field of Search ............ 152/451, 526, 527; 57/902

[56] References Cited

U.S. PATENT DOCUMENTS

| | | | |
|---|---|---|---|
| 2,939,503 | 6/1960 | Fröhlich et al. | 152/527 |
| 3,513,898 | 5/1970 | Lugli et al. | 152/535 |
| 4,047,552 | 9/1977 | Maeda et al. | 152/527 |
| 4,371,025 | 2/1983 | Canevari et al. | 152/527 |
| 4,506,500 | 3/1985 | Miyauchi et al. | 57/902 |
| 4,651,513 | 3/1987 | Dambre | 152/527 X |
| 4,749,017 | 6/1988 | Loesch | 152/527 |
| 4,819,705 | 4/1989 | Caretta . | |
| 5,024,261 | 6/1991 | Igarashi et al. | 152/527 |

FOREIGN PATENT DOCUMENTS 0237462 2/1987 European Pat. Off. .
3725914 7/1988 Fed. Rep. of Germany ...... 152/451

OTHER PUBLICATIONS

*Mechanics of Pneumatic Tires*, ed. Samuel Clark: US Dept. of Transportation, Aug. 1981, pp. 131, 207–225.
"Rubber Articles Reinforced with High Tensile Steel Cord", Research Disclosure No. 184, Aug. 1979, pp. 430–431.

Primary Examiner—Michael W. Ball
Assistant Examiner—Adrienne C. Johnstone
Attorney, Agent, or Firm—T. P. Lewandowski

[57] ABSTRACT

A multi-layer circumferentially reinforced radial pneumatic light truck tire having a belt structure of at least two layers of 2°2x.30HT cord for both Load Range C and D.

12 Claims, 2 Drawing Sheets

PNEUMATIC RADIAL TIRE INCLUDING STEEL BELT CORDS OF 2+2X.30HT CONSTRUCTION

This application is copending with assignee's U.S. Pat. No. 4,926,919 which discloses a cord of four filaments each having a diameter of 0.30 mm in a belt structure of a tire having two plies or layers each with cords of at least 820 Newtons and preferably 890 Newtons plus or minus 65 Newtons (at page 4) break strength in a light truck (LT) tire which is hereby incorporated by reference thereto.

The present invention relates to radial tires for vehicles, i.e., those tires wherein the cords of the carcass plies which extend from one bead to the other lie substantially on radial planes.

Particularly, the present invention relates to light truck tires having less weight favoring low rolling resistance to absorb less horsepower while maintaining the strength of the previous heavier construction as well as ride and handling.

Assignee's prior application, now published as EP O 237462 on Sep. 16, 1987, discloses a two ply passenger tire belt having cords of 2x.30HT construction. The high tensile material used was the same as that being used herein and was described as high carbon steel with a carbon content by weight of greater than 0.80%.

Previous light truck tires had three different cords to reinforce the belt package for Load Ranges B, C and D. While the known 2x.30HT, above, was useful to replace 2+2x.25NT at 20 EPI for Load Range B tires, 2+2x.30HT was chosen for Load Range C tires. Load Range D tires and above previously used 3x.265/9x.245HT+1 (compact, i.e., inner and outer layer both layers with twist in the same direction) cord with a wrap wire at 10 EPI.

After considerable study, effort, testing and time, the present invention provided a single cord for both Load Ranges C and D which substantially reduced the number of filaments for Load Range D and, surprisingly, resulted in a larger cord diameter for Load Range C with the same number of filaments. While a reduction in the number of filaments would lead one to expect a reduction in weight, this would not be the case where the filament size was increased and the number of filaments maintained. As a result, a single cord was found for use in both Load Ranges C and D by varying the ends per inch (EPI) in the plies of the belt. Other advantages which exist in the present invention include improved rolling resistance in at least one instance and a reduction in the cord gum coat gauge between the cord layers in the belt in another instance. A weight reduction due to reduction in weight of reinforcement as well as reduction in an amount of gum gauge also result in a reduction in cost for the tire of the present invention. Further, the new belt structure gives greater rolling resistance perhaps because of the higher stiffness of the new cord over the old cord being used for reinforcement in the belt structure.

This invention provides the above advantages in a pneumatic radial tire with a carcass having radial cords and two sidewalls spaced apart a distance which in the axial direction determines the width of the tire section. The tire has two beads each one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the tread and has two radially overlapped layers of elastomeric fabric reinforced with metallic cords. The metallic cords are parallel to each other in each layer and crossed with the cords of the facing layer and inclined at an angle of between 16° and 30° with respect to the equatorial plane of the tire. The gauge of the gum between two facing cords on the plane of a cross section of the tire preferably is not larger than 0.064 cm throughout the entire width of the annular reinforcing structure. The metallic cords are two twisted filaments twisted with parallel filaments all filaments of about 0.30 mm diameter high tensile steel and being distributed in each layer with a density of 13 EPI (5.1 ends per centimeter) for Load Range C to 17 EPI (6.7 ends per centimeter) for Load Range D.

In a further aspect of the present invention the annular reinforcement structure of the above defined tire has a stiffness ratio in relation to a control structure of equal to at least 1.05.

The features of the present invention which are believed to be novel are set forth with particularity in the appended claims. The present invention both as to its structure and manner of operation may best be understood by reference to the following detailed description, taken in accordance with the accompanying drawings in which:

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two layers or plies of parallel cords, woven or unwoven, underlying the tread, unanchored to the bead, and having both left and right cord angles in the range from 16 degrees to 30 degrees with respect to the equatorial plane of the tire.

"Carcass" means the tire structure apart from the belt structure, tread, undertread, and sidewall rubber over the plies, but including the beads.

"Cord" means one or more of the reinforcement elements, formed by one or more filaments/wires which may or may not be twisted or otherwise formed which may further include strands so formed which strands may or may not be also so formed, of which the plies in the tire are comprised.

"Crown" means that portion of the tire within the width limits of the tire tread.

"Density" means quantity per unit length.

"Equatorial plane (EP)" means the plane perpendicular to the tire's axis of rotation and passing through the center of its tread.

"Gauge" means material thickness.

"High Tensile Steel" (HT) means a carbon steel with at least 0.80% carbon by weight, or a tensile strength of at least 3240 Mpa.

"Load Range C and D" means load and inflation limits for a given tire used in a specific type of service as defined by tables in *The Tire and Rim Association, Inc.*, 1989 Year Book.

"Radial" and "radially" are used to mean directions radially toward or away from the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Stiffness Ratio" means the value of the control belt structure stiffness divided into the value of another belt structure when the values are determined by a fixed three (3) point bending test having both ends of the cord fixed and flexed by a load centered between the fixed ends.

"Tread" means that portion of a tire that comes into contact with the road when the tire is normally inflated and under normal load.

Figure 1:
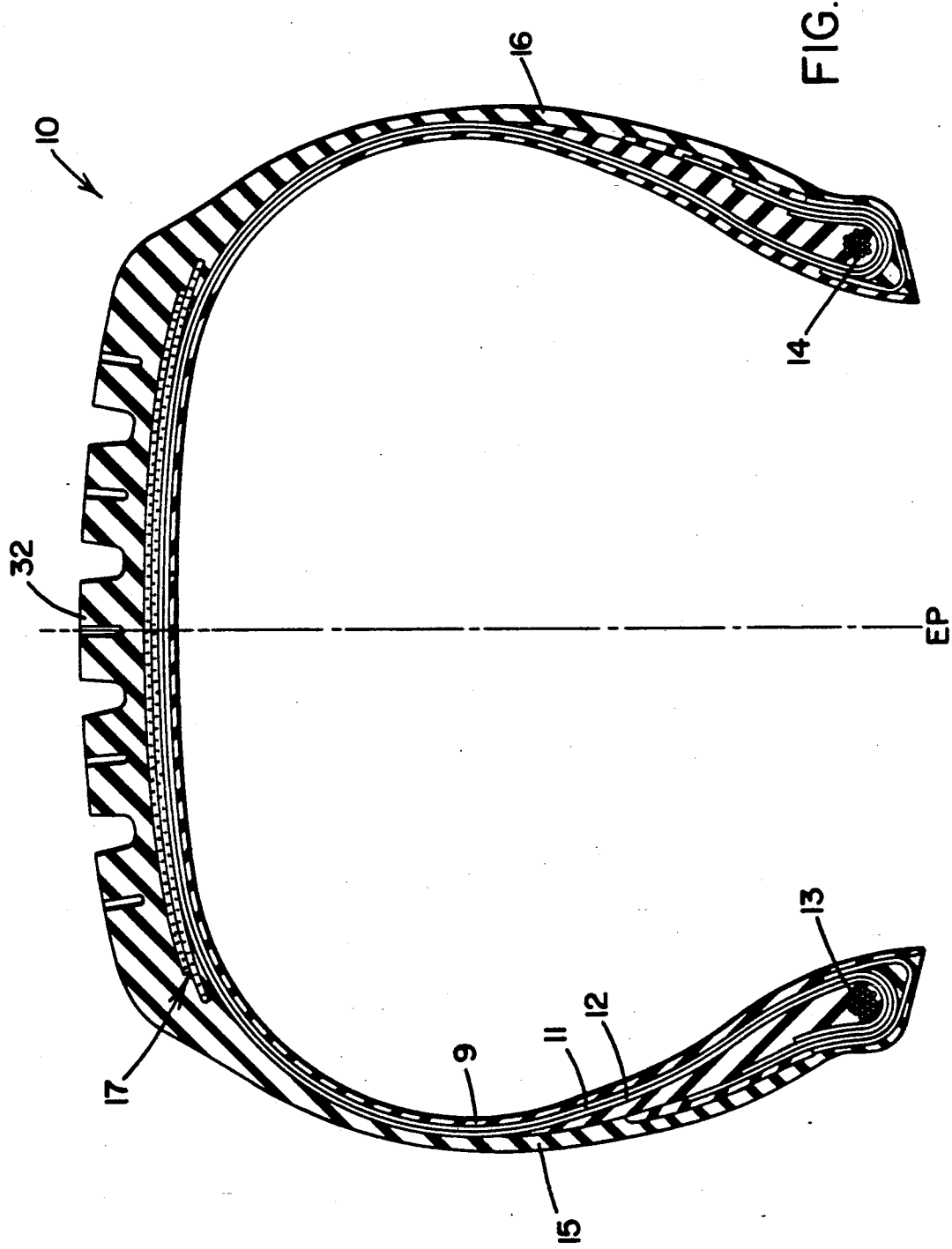
FIG. 1 is a cross sectional view of a tire in a plane that contains the axis of rotation of the tire and in accordance with the present invention.
Figure 2:
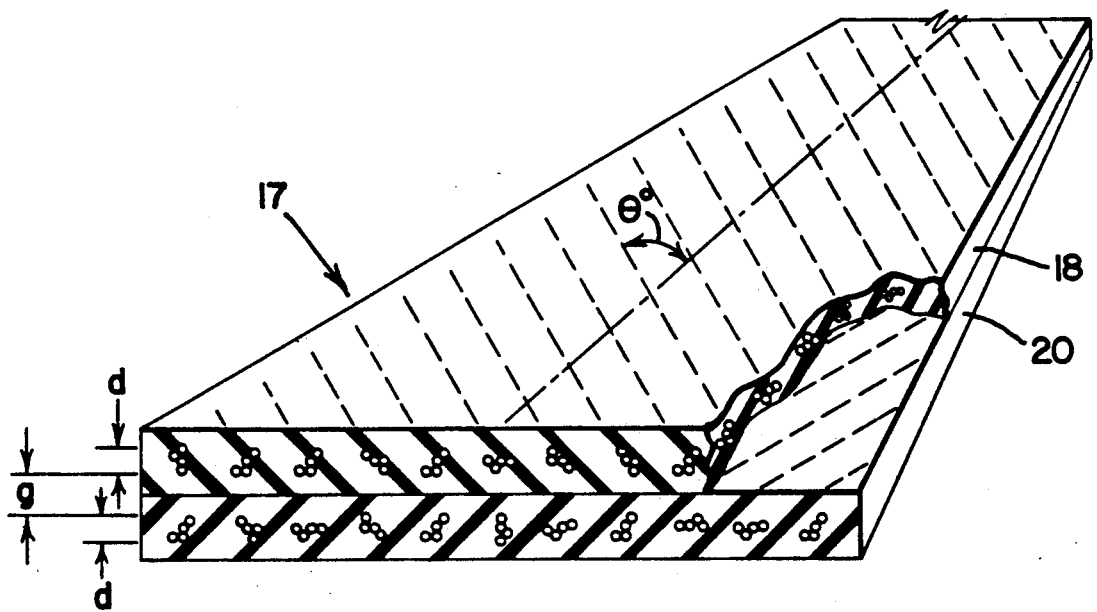
FIG. 2 is an enlarged schematic of the annular reinforcing portion of the tire shown in FIG. 1.
Figure 3:
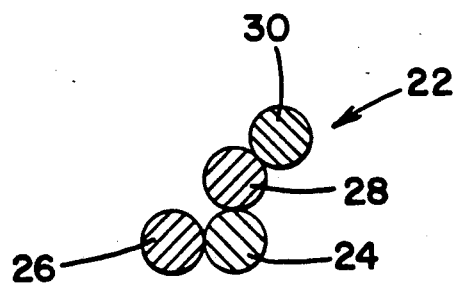
FIG. 3 is an enlarged cross sectional view of a cord from the structure portion of the tire in FIG. 2.

Referring to FIGS. 1 to 3, there is illustrated, by means of a working example, a tire of size LT215/85R16 Load Range D according to a preferred embodiment, and all actual dimensions related therein are for a tire of said size. A pneumatic tire (10) according to the invention has what-is commonly referred to in the tire art as a radial ply carcass structure. For the purposes of the present invention, a tire has a radial ply carcass structure when the cords of the carcass reinforcing ply, or plies 11,12, are oriented at angles in the range of 75° to 90° with respect to the equatorial plane (EP) of the tire.

A tire 10 according to the invention has a pair of substantially inextensible annular beads 13,14 which are axially spaced apart from one another. Each of the beads 13,14 is located in a bead portion of the tire which has exterior surfaces configured to be complimentary to the bead seats and retaining flanges of a rim (not shown) upon which the tire is designed to be mounted. A radial ply carcass structure, in the preferred embodiment comprising two plies 11,12 of side-by-side reinforcing cords of polyester material, extends between the beads with an axially outer portion of the carcass structure folded about each of the beads. While in the preferred embodiment, the carcass ply structure comprises two plies of reinforcing material, it is understood that one or more carcass plies of any suitable material may be employed without deviating from the scope of the present invention.

Preferably, a tire according to the invention is a tubeless tire having a layer of a low permeability material 9 disposed inwardly of the carcass plies 11,12 and contiguous to an inflation chamber defined by the tire and rim assembly. Elastomeric sidewalls 15,16 are disposed axially outwardly of the carcass structure. A circumferentially extending belt structure 17 comprising two layers 18,20 (FIG. 2), each of which preferably comprises steel reinforcing cords 22 (FIG. 3) characterized by the cords 22 having filaments 24,26,28 and 30 with a breaking strength of at least 3240 Mpa. The cords 22 used in the working example have a structure of four filaments 24,26,28 and 30 of 0.30 mm diameter high tensile steel wire and a cord 22 break strength of 890 Newtons plus or minus 65 Newtons. Each cord 22 has two filaments 24,26 twisted together with a 16 mm lay length and these two filaments 24,26 are twisted at a 16 mm lay length together with the remaining two filaments 28,30 which are untwisted and parallel to each other when twisted together with the twisted filaments 24,26 all in the same twist direction. This cord is designated as 2+2x.30HT. The 2+2 construction is known for its openness and good rubber penetration resulting from the openness. The 0.30 designates the filament diameter in millimeters and the HT designates the material being high tensile.

More particularly, initially Load Range C tires were built with two belts as illustrated in FIG. 3 with 2+2x.30HT cords at 16 EPI (6.3 ends per centimeter) with the angle $\theta$ of one ply being approximately 21° and the other ply having an identical but opposing angle. The next build of this tire in this load range altered the end count from the above 16 EPI (6.3 ends per centimeter) to 13 EPI (5.1 ends per centimeter) resulting in an increase in belt stiffness and the gum gauge (g) between the cords in opposing layers 18,20 in comparison to a production reinforcement which it is to replace of 2+2x.25NT (Normal Tensile) at 20 EPI (7.9 ends per centimeter) in a control tire. This build was followed by a build of Load Range D tires with a belt package as described above for the Load Range C tires except the reinforcement in the two belt layers 18,20 now was increased to 17 EPI (6.7 ends per centimeter) resulting in an increase in stiffness but a decrease in the gum gauge (g) between the cords in opposing layers 18,20 in comparison to a production reinforcement which it is to replace of 3x.265/9x.245HT+1 at 10 EPI (3.9 ends per centimeter) in a control tire. The above tire selections came only after extensive study and testing which included the lab test results in Table I below.

TABLE I

| CORD | Test Tire - LT225/75R16 WRL ST | | | | |
|---|---|---|---|---|---|
| | 2 + 2 × .25 NT (7.9 end/cm) 20 EPI | 2 + 2 × .30 HT (4.7 ends/cm) 12 EPI | 2 + 2 × .30 HT (5.5 ends/cm) 14 EPI | 2 + 2 × .30 HT (6.3 ends/cm) 16 EPI | 2 + 2 × .30 HT (7.1 ends/cm) 18 EPI |
| ROLLING RESISTANCE LRC IN COMPARISON TO CONTROL | | | (Control) | | |
| Rated Load | 101 | 102 | 100 | ** | ** |
| 1300 lb Load | 102 | 103 | 100 | ** | ** |
| ROLLING RESISTANCE LRD | | | | | |
| Rated Load | ** | ** | 100 | 107 | 106 |
| 1300 lb Load | ** | ** | 100 | 108 | 108 |
| TREADWEAR IN COMPARISON TO CONTROL | | | | | |
| | (Control) | | | | |

TABLE I-continued

| | Test Tire - LT225/75R16 WRL ST | | | | |
|---|---|---|---|---|---|
| CORD | 2 + 2 × .25 NT (7.9 end/cm) 20 EPI | 2 + 2 × .30 HT (4.7 ends/cm) 12 EPI | 2 + 2 × .30 HT (5.5 ends/cm) 14 EPI | 2 + 2 × .30 HT (6.3 ends/cm) 16 EPI | 2 + 2 × .30 HT (7.1 ends/cm) 18 EPI |
| LR C Projected Wear | 100 | 113 | — | — | 113 |

It was found that none of the tires failed as a result of the belt structure in either the HS (High Speed) Outdoor Resilometer or DOT Extended Tests. The force test for both Load Ranges were within three points of each other for Load Range C and one point for Load Range D. From Table I it was concluded that for the Rolling Resistance Test, under Load Range C, 2+2x.25NT, 2+2x.30HT at 12 EPI and 2+2x.30HT at 14 EPI were within 2% of each other while 2+2x.30HT at 16 EPI was 8% better. Tread wear was improved with 2+2x.30HT at 12 EPI over 2+2x.25NT at 20 EPI under Load Range C.

Further it was learned that between 3x.265/9x.245HT+1 at 12 EPI, the previous production cord, and 2+2x.30HT at 16 EPI, the rolling resistance and tread wear are equal, but the tire weight is 6% less.

From the above data, by extrapolation, it was determined that for Load Range C, 13 EPI would be the preferred count while for Load Range D, 17 EPI would be preferred to extend the use of 2+2x.30HT cord over both Load Ranges C and D where previously 2+2x.25NT at 20 EPI was used for Load Range C and 3x.245/9x.245HT+1 at 10 EPI was used for Load Range D. The reduction in weight came in Load Range D and the rolling resistance for for Load Range D was 8% better. For example, on a LT215/85R16 tire, Load Range D, the weight savings are up to 5% per tire.

A factory process trial build of 19,000 tires was made and sold on approximately May 12, 1988, to determine factory handling characteristics.

The weight savings are from a reduction in not only the weight of the reinforcing cord but in some instances also from a reduction in the gum between the reinforcing cord layers. Turning to FIG. 2 it can be appreciated that if the coating for a given cord decreases with the cord diameter (d) then the gauge (g) of the gum between the cord layers will be reduced as well. For example, if the cord diameter is the average diameter of the smallest surrounding circle around a normal cross section of the cord, the Load Range D previous cord of 3x.265/9x.245HT+1 has a cord diameter of 0.040 inches while the 2+2x.30HT cord has a diameter of 0.031 inches. As a result, the gum gauge (g) for 3x.265/9x.245HT+1 is 0.033 inches while for 2+2.x30HT the gum gauge (g) is 0.025 inches, a 24% reduction. The above reduction made production of reinforcement for tires in Load Ranges C and D more economical, and resulted in 2+2x.30HT cord being useful over both Load Ranges C and D for light truck tires.

Lastly, it has been observed for Load Range D the belt structure for a LT215/85R16 tire with 2+2x.30HT at 17 EPI and a belt gum gauge of 0.025 inches (0.064 cm) has a stiffness of 11.04 Newtons on a laboratory 3 point bending, i.e., fixed ends center impingment, stiffness test as compared to 10.2 Newtons for its predecessor, 3x.265/9x.245HT+1 at 10 EPI on the same test. This is a ratio of 1.10 of the new belt stiffness over the old (control). While not proven it is possible that the belt stiffness is responsible for, or at least contributes to, the 8% improvement in rolling resistance noted above. The same phenomenon for belt edge stiffness can be observed for Load Range C, although not as predominant, which might explain why the advantage in rolling resistance was not observed in Load Range C. Here the new belt structure using 2+2x.30HT at 13 EPI had a stiffness of 8.16 Newtons as compared to 7.7 Newtons for the control which was the predecessor, 2+2x.25NT at 20 ends per inch. The above stiffness values give a stiffness ratio of 1.06 for the Load Range C.

In accordance with the provisions of the patent statutes, the principle and mode of operation of the tire have been explained and what is considered to be its best embodiment has been illustrated and described. It should, however, be understood that the invention may be practiced otherwise than as specifically illustrated and described without departing from its spirit and scope.

We claim:

1. A load range C pneumatic radial tire with a carcass having radial cords, two sidewalls spaced apart a distance, which in the axial direction, determines the width of the tire section, two beads each one of which around which are turned up, from the inside toward the outside, the ends of the cords of the carcass, and a belt structure that is circumferentially inextensible interposed between the tread and the carcass, the belt structure having a width that is substantially equal to that of the tread and having at least two radially overlapped layers of elastomeric fabric reinforced with metallic cords, the metallic cords being parallel to each other in each layer at a density of 12 to 18 EPT (4.7 to 7.1 ends per centimeter) and crossed with the cords of the facing layer and inclined at an angle of between 16° and 30° with respect to the equatorial plane of the tire, comprising the gauge of the gum between two facing cords, on the plane of a cross section of the tire being between 0.05 cm (0.020 inches) and 0.080 cm (0.03 inches) throughout the entire width of the belt structure, the metallic cords being two twisted filaments twisted with two parallel filaments all filaments of 0.30 mm diameter high tensile steel.

2. The tire defined in claim 1 wherein the belt structure thereof has a stiffness ratio in relation to a control structure of 2+2x.2NT at 20 EPI (7.9 ends per centimeter equal to at least 1.05.

3. The tire defined in claim 1 wherein said gum gauge is not larger than 0.064 cm (0.025 inches).

4. The tire defined in claim 1 wherein said belt structure has only two layers.

5. The tire defined in claim 1 wherein said cords are inclined at an angle of about 21° with respect to the equatorial plane of the tire.

6. The tire defined in claim 1 wherein the belt structure thereof has a stiffness ratio in relation to a control structure of 2+2x.25NT at 20 EPI (7.9 ends per centimeter) equal to at least 1.05, said gum gauge is not larger than 0.064 cm (0.025 inches), said belt structure has only two layers, and said cords are inclined at an angle of about 21° with respect to the equatorial plane of the tire.

7. A load range D pneumatic radial tire with a carcass having radial cords, two sidewalls spaced apart a distance, which in the axial direction, determines the width of the tire section, two beads each one of which around which are turned up, from the inside toward the outside, the ends of the cords of the carcass, a tread disposed on the crown of the carcass, and a belt structure that is circumferentially inextensible interposed between the tread and the carcass, the belt structure having a width that is equal to that of the tread and having at least two radially overlapped layers of elastomeric fabric reinforced with metallic cords, the metallic cords being parallel to each other in each layer at a density of 14 to 18 EPI (5.5 to 7.1 ends per centimeter) and crossed with the cords of the facing layer and inclined at an angle of between 16° and 30° with respect to the equatorial plane of the tire, comprising the gauge of the gum between two facing cords, on the plane of a cross section of the tire being between 0.05 cm (0.020 inches) and 0.080 cm (0.03 inches) throughout the entire width of the belt structure, the metallic cords being two twisted filaments twisted with two parallel filaments all filaments of 0.30 mm high tensile steel.

8. The tire defined in claim 7 wherein the belt structure thereof has a stiffness ratio in relation to a control structure of 3x.265/9x.245HT+1 at 10 EPI (3.9 ends per centimeter) equal to at least 1.05.

9. The tire defined in claim 7 wherein said gum gauge is not larger than 0.064 cm (0.025 inches).

10. The tire defined in claim 7 wherein said belt structure has only two layers.

11. The tire defined in claim 7 wherein said cords are inclined at an angle of about 21° with respect to the equatorial plane of the tire.

12. The tire defined in claim 7 wherein the belt structure thereof has a stiffness ratio in relation to a control structure of 3x.265/9x.245HT+1 at 10 EPI (3.9 ends per centimeter) equal to at least 1.05, said gum gauge is not larger than 0.064 cm (0.025 inches), said belt structure has only two layers, and said cords are inclined at an angle of about 21° with respect to the equatorial plane of the tire.

* * * * *